US011006004B2

(12) United States Patent
Lee

(10) Patent No.: US 11,006,004 B2
(45) Date of Patent: May 11, 2021

(54) MANUAL ROAMING AND DATA USAGE RIGHTS

(71) Applicant: Samsung Electronics Co., Ltd., Suwon-si (KR)

(72) Inventor: Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/638,367

(22) PCT Filed: Aug. 10, 2018

(86) PCT No.: PCT/KR2018/009168
§ 371 (c)(1),
(2) Date: Feb. 11, 2020

(87) PCT Pub. No.: WO2019/031912
PCT Pub. Date: Feb. 14, 2019

(65) Prior Publication Data
US 2020/0366794 A1   Nov. 19, 2020

(30) Foreign Application Priority Data
Aug. 11, 2017   (KR) ........................ 10-2017-0102416

(51) Int. Cl.
*H04M 15/00*   (2006.01)
*H04W 4/24*   (2018.01)
(Continued)

(52) U.S. Cl.
CPC ....... *H04M 15/66* (2013.01); *H04M 15/8038* (2013.01); *H04M 15/8214* (2013.01);
(Continued)

(58) Field of Classification Search
CPC ............. H04M 15/66; H04M 15/8038; H04M 15/8214; H04M 15/8228; H04W 4/24;
(Continued)

(56) References Cited

U.S. PATENT DOCUMENTS 7,554,942 B2   6/2009   Joong et al.
8,913,987 B2   12/2014   Lee et al.
(Continued)

FOREIGN PATENT DOCUMENTS

KR   10-2016-0056118 A   5/2016
KR   10-2018-0021630 A   3/2018
(Continued)

OTHER PUBLICATIONS

"3rd Generation Partnership Project; Technical Specification Group Services and System Aspects; Study on Architecture for Next Generation System (Release 14)", 3GPP TR 23.799 V14.0.0 (Dec. 2016), 527 pages.
(Continued)

*Primary Examiner* — Ernest G Tacsik

(57) ABSTRACT

Disclosed is a 5G or pre-5G communication system to be provided to support a data transmission rate higher than that of a 4G communication system such as LTE. The present disclosure relates to a session management method through selection of a roaming operator and utilization of data usage rights of a local operator by a user in a 5G system. The user selects the local operator by switching the operator to a manual mode during roaming, accesses a data usage rights purchase agency through a limited service provided by the operator and then purchases the data usage rights of the local operator, and connects to a data network through authentication of a session by using authentication information included in the data usage rights.

16 Claims, 14 Drawing Sheets

(51) Int. Cl.
*H04W 12/06* (2021.01)
*H04W 84/04* (2009.01)

(52) U.S. Cl.
CPC ......... *H04M 15/8228* (2013.01); *H04W 4/24* (2013.01); *H04W 12/06* (2013.01); *H04W 84/042* (2013.01)

(58) Field of Classification Search
CPC ... H04W 12/06; H04W 84/042; H04W 12/04; H04W 76/10; H04W 76/12; H04W 80/02; H04W 60/04; H04L 67/141
See application file for complete search history.

(56) References Cited

U.S. PATENT DOCUMENTS

| | | | |
|---|---|---|---|
| 9,491,606 | B2 | 11/2016 | Cho et al. |
| 2008/0086634 | A1 | 4/2008 | Salowey et al. |
| 2012/0196566 | A1 | 8/2012 | Lee et al. |
| 2016/0044484 | A1 | 2/2016 | Cho et al. |
| 2017/0171752 | A1* | 6/2017 | Lee ............... H04W 76/10 |
| 2017/0332312 | A1 | 11/2017 | Jung et al. |
| 2018/0063860 | A1* | 3/2018 | Yeung ............ H04W 4/70 |
| 2019/0007560 | A1* | 1/2019 | Yan ............... H04L 12/1407 |
| 2019/0028482 | A1* | 1/2019 | Pallas ............ H04L 63/20 |
| 2019/0191309 | A1 | 6/2019 | Kweon et al. |

FOREIGN PATENT DOCUMENTS

| | | |
|---|---|---|
| WO | 2016140469 A1 | 9/2016 |
| WO | 2017019118 A1 | 2/2017 |
| WO | 2017105777 A1 | 6/2017 |

OTHER PUBLICATIONS

"3rd Generation Partnership Project; Technical Specification Group Services and System Aspects; Security Architecture and Procedures for 5G System (Release 15)", 3GPP TS 33.501 V0.2.0 (May 2017), 25 pages.
"3rd Generation Partnership Project; Technical Specification Group Services and System Aspects; Procedures for the 5G System; Stage 2 (Release 15)", 3GPP TS 23.502 V0.5.0 (Jul. 2017), 153 pages.
Samsung, "DN Authorization Profile", SA WG2 Meeting #S2-122bis, Aug. 21-25, 2017, S2-175421, 2 pages.
Samsung, "TS 23.501: Additional DN authorization data", SA WG2 Meeting #S2-124, Nov. 27-Dec. 1, 2017, S2-178294, 3 pages.
Supplementary European Search Report dated Apr. 21, 2020 in connection with European Patent Application No. 18 84 4909, 16 pages.
ISA/KR, International Search Report and Written Opinion of the International Searching Authority, International Application No. PCT/KR2018/009168, Nov. 20, 2018, 11 pages.

* cited by examiner

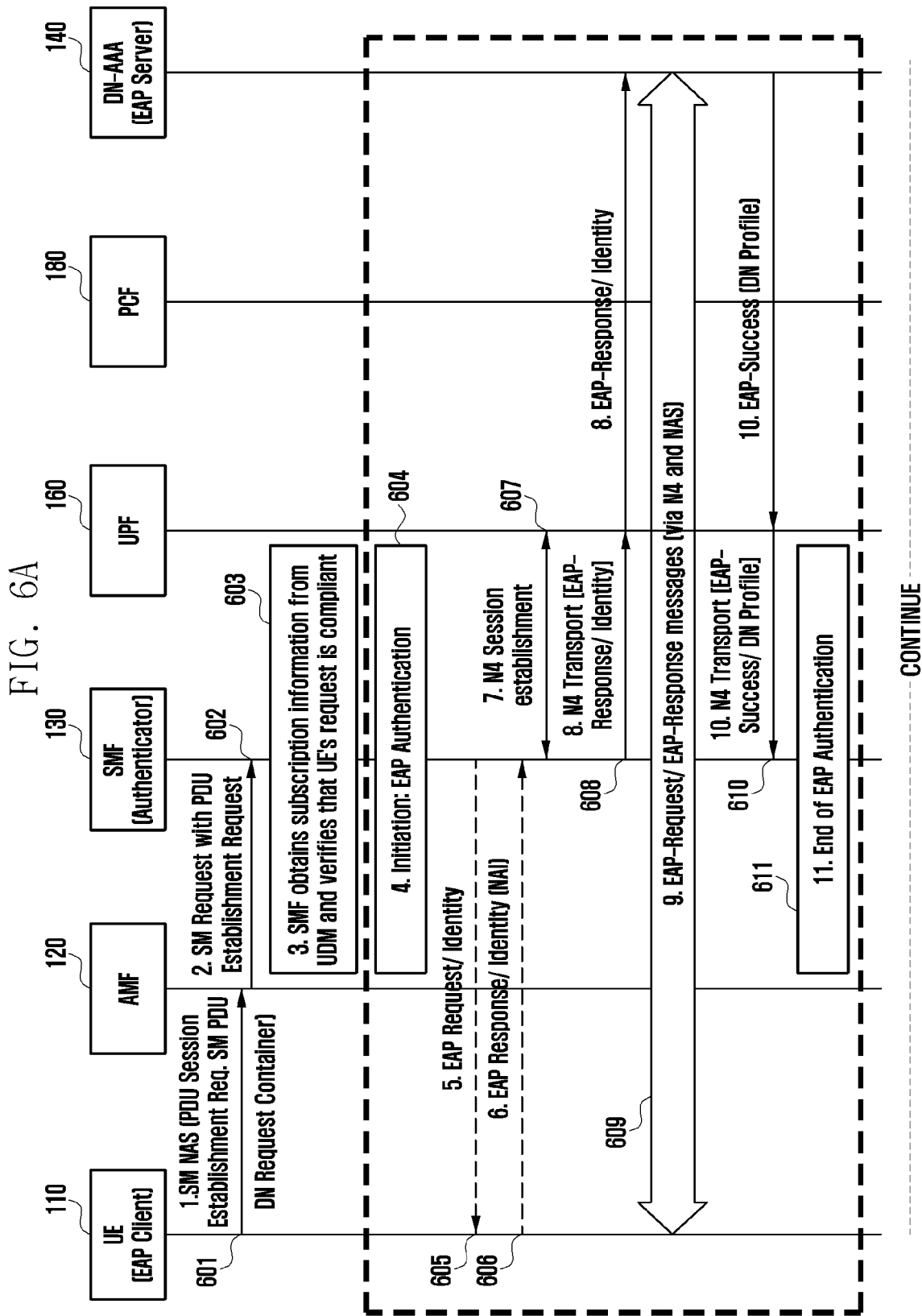

DATA SHOPPING SCREEN [PORTAL]

MANUAL ROAMING AND DATA USAGE RIGHTS

CROSS-REFERENCE TO RELATED APPLICATIONS

This application is a 371 National Stage of International Application No. PCT/KR2018/009168, filed Aug. 10, 2018, which claims priority to Korean Patent Application No. 10-2017-0102416, filed Aug. 11, 2017, the disclosures of which are herein incorporated by reference in their entirety.

BACKGROUND

1. Field

The disclosure relates to a method and apparatus for providing a data service through a mobile communication network to a terminal, which has not subscribed to and manually selects a mobile communication roaming service.

2. Description of Related Art

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post-LTE system.

In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mm Wave band and increase a propagation transmission distance.

Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, 3GPP, which is in charge of the cellular mobile communication standard, is proceeding with standardization of a new Core Network structure under the name of 5G Core (5GC) in order to evolve from the existing 4G LTE system to the 5G system.

5GC supports the following differentiated functions compared to evolved packet core (EPC), which is a network core for the existing 4G.

First, 5GC introduces a network slice function. According to the requirements of 5G, 5GC must support various types of terminals and services. For example, services provided by 5GC may include enhanced mobile broadband (eMBB), ultra-reliable low latency communications (URLLC), and massive machine type communications (mMTC) services. These terminals/services have different requirements for the core network, respectively. For example, eMBB service may require high data rate and a URLLC service requires a high stability and low latency. A technology proposed to satisfy these various service requirements is the network slice function. Network slicing is a method for generating several logical networks by virtualizing a single physical network, and network slice instances (NSIs) may have different characteristics, respectively. This is possible because each NSI has a network function (NF) according to characteristics thereof. Accordingly, the 5G network can efficiently support various 5G services by allocating NSIs according to the characteristics of services required for each terminal.

Second, 5GC may easily support a network virtualization paradigm by separating a mobility management function and a session management function. In the existing 4G LTE, all terminals may receive services in a network through signaling exchange with a single core device called a mobility management entity (MME), which is in charge of registration, authentication, mobility management, and session management functions. However, in 5G, as the number of terminals phenomenally increases and the mobility and traffic/session characteristics that must be supported according to the types of terminals are segmented, if all the functions are supported by a single device such as an MME, the scalability of adding entities for each required function is inevitably fall. Therefore, various functions are being developed on the basis of a structure that separates the mobility management function and the session management function in order to improve scalability in terms of function/implementation complexity and signaling load of a core device that is in charge of a control plane.

SUMMARY

The disclosure provides a method and apparatus for providing, by a mobile communication service provider, a specific data service to a user or terminal which is not subscribed to a mobile communication network, according to service provider configuration information and a service request of the terminal.

Measures for solving the problem of the disclosure are as follows:

Search for a mobile communication service provider manual selection mode and service provider information of a terminal Provide DN information that can be used by an unauthenticated/unsubscribed terminal, by a mobile communication network Establish a restricted session for purchasing a data voucher of an unauthenticated terminal Generate a session through session authentication after providing DN information, by an unauthenticated terminal Configure session expiration notification and notify of session expiration In order to achieve the above objective, a communication method by an SMF according to an embodiment of the disclosure may include: receiving, from a terminal, a message for establishment of a protocol data unit (PDU) session; performing authentication of the PDU session, together with a data network authentication authorization accounting (DN-AAA) server; and receiving, from the DN-AAA server, an authentication response message including data network (DN) profile information.

Further, the DN profile information may include a DN profile index.

Furthermore, the DN profile index is used for searching for a QoS policy from a policy control function (PCF).

Still furthermore, the reception of the message for establishment of the protocol data unit (PDU) session may include:

receiving, by the terminal, information indicating that a public land mobile network (PLMN) supports an unauthenticated access mode from a network, performing access for the unauthenticated access mode, and then receiving from the terminal a request message for the establishment of the PDU session required to be authenticated.

Further, in order to achieve the above objective, a communication method by a DN-AAA server according to an embodiment of the disclosure may include: receiving a request for authentication of a protocol data unit (PDU) session from a session management function (SMF) which has received a message for establishment of the PDU session from a terminal, and performing authentication thereof; and transmitting an authentication response message including data network (DN) profile information to the SMF.

Furthermore, in order to achieve the above objective, an SMF according to an embodiment of the disclosure may include: a transceiver; and a controller coupled with the transceiver and configured to receive a message for establishment of a protocol data unit (PDU) session from a terminal, perform authentication of the PDU session, together with a data network authentication authorization accounting (DN-AAA) server, and receive an authentication response message including data network (DN) profile information from the DN-AAA server. Still furthermore, in order to achieve the above objective, a DN-AAA server according to an embodiment of the disclosure may include a transceiver, and a controller coupled with the transceiver and configured to receive a request for authentication of a protocol data unit (PDU) session from a session management function (SMF) having received from a terminal a message for establishment of the PDU session, and perform authentication thereof; and transmit an authentication response message including data network (DN) profile information to the SMF.

According to the disclosure, in a case of personal or business travel abroad, a user may use a data service, an audio/video communication service, and a supplementary service of a local service provider by utilizing a data voucher provided by the local service provider, without being associated with a home service provider of the user and without attaching or detaching a USIM or without modification of USIM information.

BRIEF DESCRIPTION OF THE DRAWINGS

FIG. 6A and FIG. 6B illustrate a session access authentication procedure and a DN profile reception and configuration procedure according to an embodiment of the disclosure.

DETAILED DESCRIPTION

Hereinafter, embodiments of the disclosure will be described in detail with reference to the accompanying drawings. In the following description of the disclosure, a detailed description of known functions or settings incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification. Hereinafter, a base station is a subject that performs resource allocation of a terminal, and may be at least one of eNode B, Node B, a base station (BS), a radio access network (RAN), an access network (AN), an RAN node, a radio access unit, a base station controller, or a node on a network. A terminal may include a user equipment (UE), a mobile station (MS), a cellular phone, a smartphone, a computer, or a multimedia system capable of performing a communication function. In the disclosure, downlink (DL) is a radio transmission path of a signal transmitted to a terminal by a base station, and uplink (UL) is a radio transmission path of a signal transmitted to the base station by a terminal. In addition, hereinafter, an embodiment of the disclosure is described using an example of LTE or LTE-A system, the embodiment of the disclosure may be applied to other communication systems having a similar technical background or a channel form. In addition, the embodiment of the disclosure may be applied to other communication systems through some modifications made within the scope of the disclosure without departing from the scope thereof according to the determination of a person skilled in the art.

Figure 1:
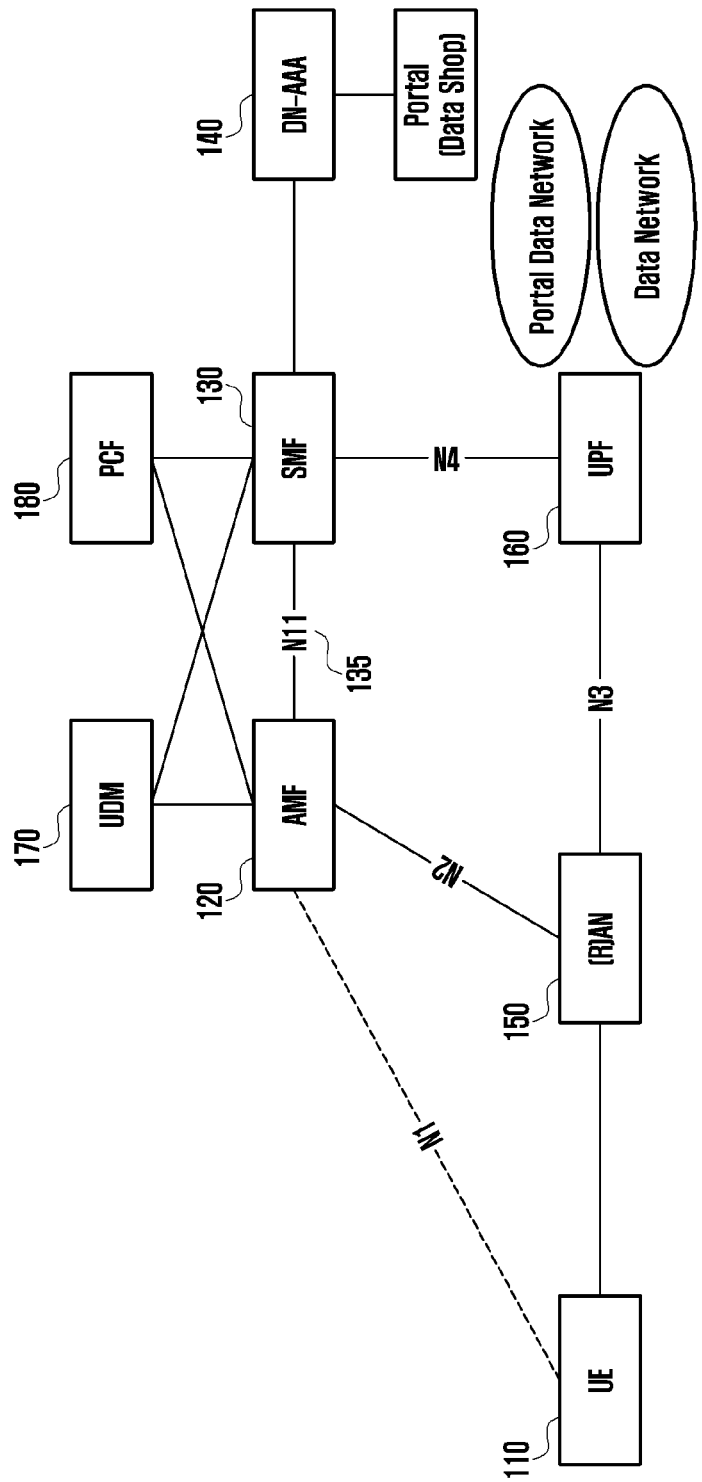
FIG. 1 illustrates a network configuration for explaining a data network use by an unauthenticated terminal according to an embodiment of the disclosure.
Figure 10:
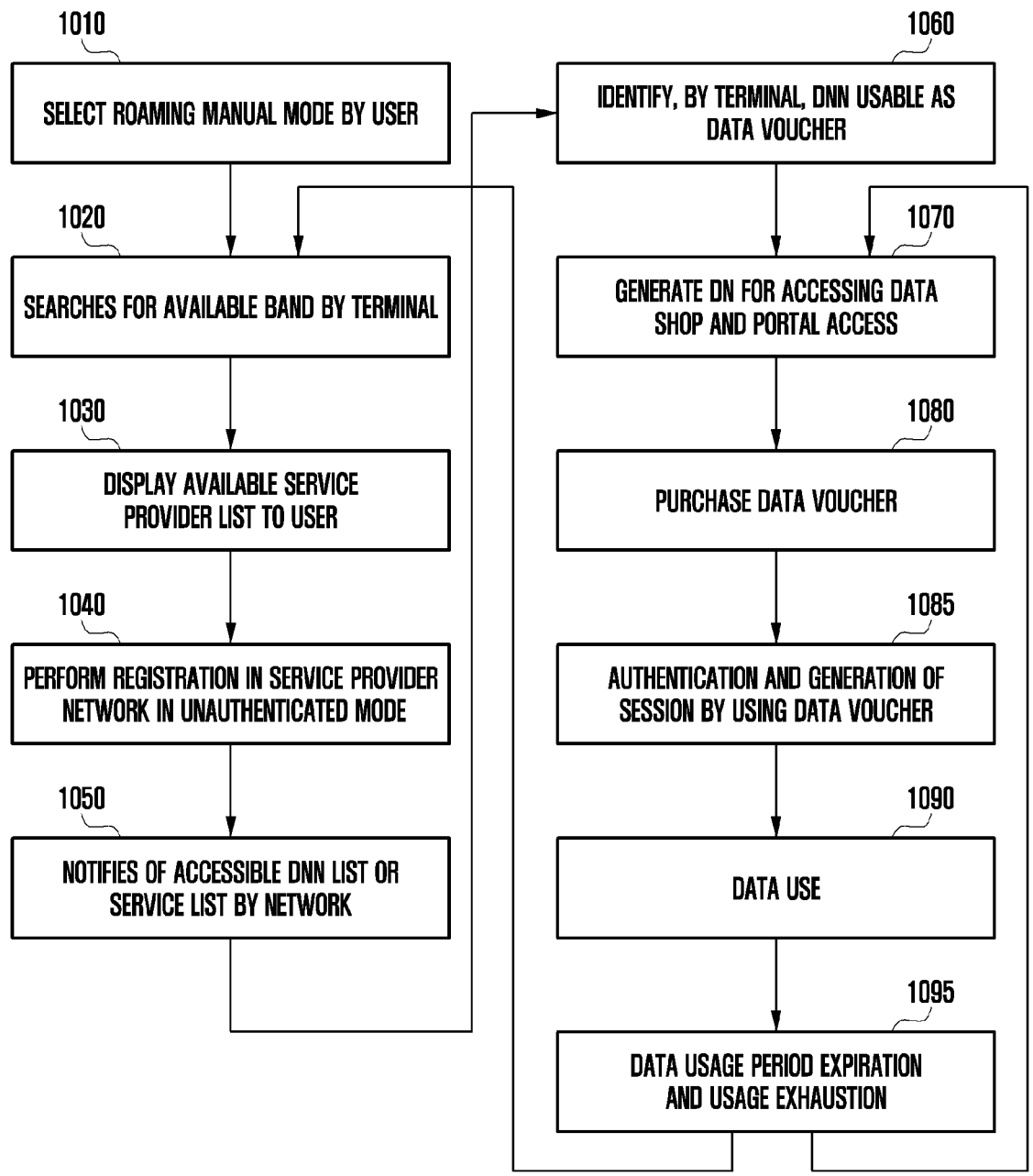
FIG. 10 illustrates an overall flowchart according to an embodiment of the disclosure.

FIG. 1 illustrates a network architecture for a 5G system according to an embodiment of the disclosure, and FIG. 10 illustrates an overall flowchart according to an embodiment of the disclosure.

Referring to FIG. 1, in a network architecture for a 5G system, an access and mobility management function (AMF) 120 for managing mobility and network registration of a UE 110 and a session management function (SMF) 130 for managing an end-to-end session may be separated, the functions 120 and 130 may transmit or receive signaling through an N11 interface 135.

In order to access a data network by the UE 110, the 5G system may allocate an IP address or an IP prefix to the UE 110, if the data network is an IP network, through the session management function (SMF) 130 for managing a session of the UE 110 during a connection process of the session.

A network configuration for providing a data service of an unauthenticated terminal is illustrated in FIG. 1. The network configuration includes a portal server for data selling, through which a user can access a network and purchase a data voucher, and a data network authentication authorization accounting (DN-AAA) server 140 that is in charge of authentication of data session access.

The disclosure proposes a manual roaming selection by a user of the UE 110 and a data service usage method using a data voucher. The overall flowchart is the same as that illustrated in FIG. 10.

If a user switches a service provider selection of a terminal into a manual selection mode (operation 1010), the UE 110 searches for an available band in the manual selection mode (operation 1020). During the process of searching, the UE 110 receives a public land mobile network (PLMN) ID broadcasted by a network and information on whether an unauthenticated access mode is supported. Whether the network supports the unauthenticated access mode may be broadcasted to the UE 110 through the SIB, and the network may notify the UE 110 of whether the network supports an unauthenticated access mode function during a registration process of the UE 110.

The UE 110 displays a list of service providers available in an unauthenticated mode according to a result of search of the UE 110, according to a search result of a service provider (operation 1030). If the user selects a service provider, the UE 110 registers in the service provider in an unauthenticated mode through a registration procedure (operation 1040). In a case where the registration procedure is performed, the UE 110 transmits information (except for IMSI) of the unauthenticated terminal to the service provider. If the UE 110 wants to access in the unauthenticated access mode, the network (i.e., the AMF 120) may request certificate-based authentication according to a policy of the service provider, and in this case, certificate-based authentication may be performed. In a case where an authentication procedure according to a service provider policy is performed or if it is determined to provide a limited service provider service without authentication, the service provider may notify a terminal of service-related details for accessing the limited service of the service provider, such as data network name (DNN) and single network slice selection assistance information (S-NSSAI), which are supportable for the uncertified UE 110 according to the service provider policy (operation 1050). For example, a list of DNNs accessible through user session authentication and a portal address for accessing a service provider's portal may be transmitted to the UE 110. The portal address for accessing the service provider's portal may also be transmitted during a session generation process.

The UE 110 identifies whether a data network (DN) usable as a data voucher exists in the presented list of DNNs (operation 1060). If a DNN usable as the data voucher does not exist, the terminal identifies whether there is a DNN for provisioning, and if the DNN for provisioning exists, the terminal requests generation of a session for accessing the DNN. The service provider may allow access after performing the policy check about whether the unauthenticated UE 110 is accessible to the provisioning DN. The network transmits the address of a portal server to the UE 110 during a session establishment process, and the terminal accesses the received portal server through a browser or a designated application (APP) of the UE 110 (operation 1070).

The portal server accessed by the UE 110 through the browser or the designated application (APP) may include a function of a data shop. The data shop sells a data voucher to a user, and the data voucher is installed in the UE 110 at the time of purchase. The data voucher includes authentication information, data usage, a list of service providers, a data shop, and additional information.

The user may purchase data by accessing the data shop and purchasing the data voucher (operation 1080), and use a data service, provided by the service provider, by using the data voucher. The data shop may be operated by a local mobile communication service provider or a terminal manufacturer, or may be operated by a third-party service operator other than the mobile communication service provider and the terminal manufacturer.

The data voucher may include information as follows:
Authentication information (Credential): the authentication information is an authentication identity (ID) and a password, and is used for authentication of an extensible authentication protocol (EAP) of a session.
Data usage (QUOTA): data usage, data usage period, and QoS information
Available list of service providers (PLMN list): List of available service providers
Data shop information: portal address, AAA server address or domain address for routing to AAA server, and authentication information
Service additional information: Phone number used by a local mobile communication service provider in the case of roaming If a user accesses a portal server and purchases a data voucher, the data voucher is installed in the user UE 110. The UE 110 may use a session after performing session authentication in an available data network of a user by using a data voucher (operations 1085 and 1090). If the data usage period of the UE 110 expires and the data usage is exhausted (operation 1095), the UE 110 or the network notifies the user of the UE 110 of the same.

The UE 110 authenticates a session by using the authentication information described in the data voucher and the DNN and S-NSSAI information transmitted to the UE 110 by a service provider through a registration process. The above procedure includes detailed procedures as follows:
The network (AMF) 120 provides the UE 110 with DNN information during a registration procedure.
The UE 110 determines whether there is a DNN matching the provisioned data voucher, and if the DNN matching the provisioned data voucher exists, the UE 110 requests for generation of a session.
The network (SMF) 130 discovers a session authentication server (AAA) 140 through data voucher information presented by the UE 110.
If authentication between the UE 110 and the session authentication server 140 is successful, the SMF 130 acquires, from the session authentication server 140, information on the usage and usage period of data purchased by the UE 110 according to an allowed service profile of the UE 110.
The UE 110, which has successfully authenticated the session, acquires information required to access a session, the information including an IP address.

If the data usage period expires or if the data usage is exhausted, the network (SMF) 130 terminates a data session. Before the expiration of the data usage period or before the data usage is exhausted, the network (SMF) 130 notifies the UE 110 of the usage period expiration. The network (SMF) 130 notifies the UE 110 of usage exhaustion before the data usage is exhausted. The UE 110 having been notified of usage exhaustion may display information of the usage period expiration and usage exhaustion to the user, and induce access to a data portal server to induce additional purchase of an additional data voucher or update of the data voucher.

First Embodiment

Figure 2:
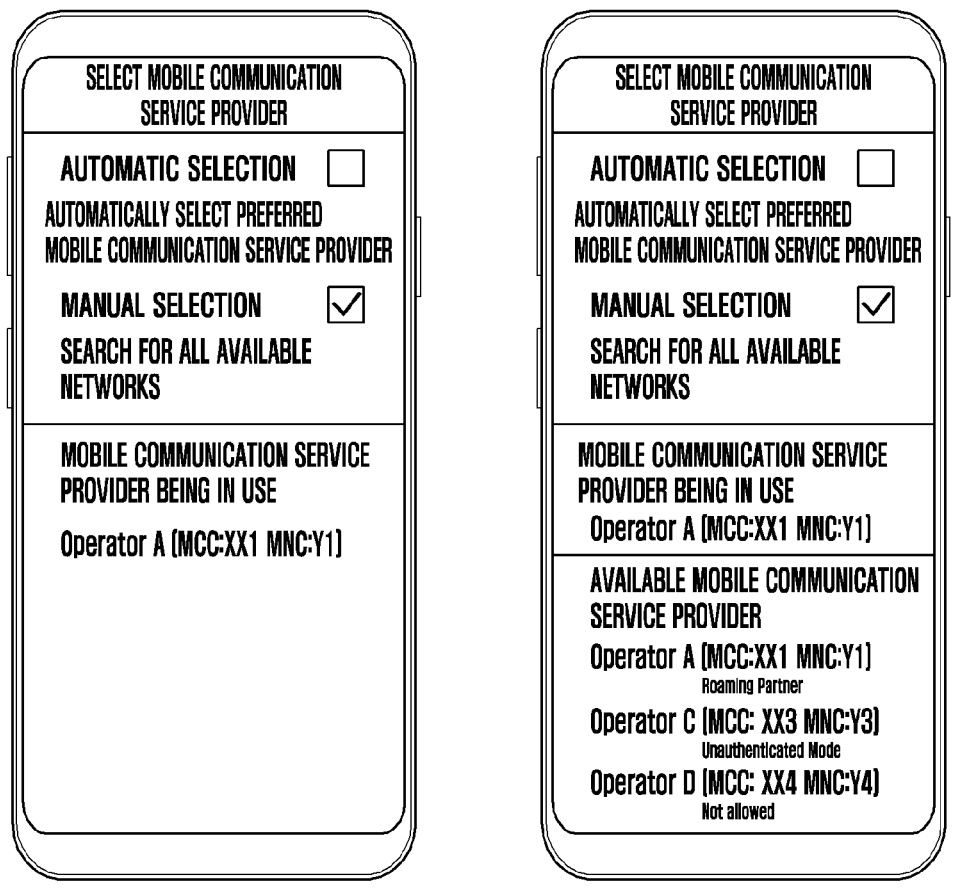
FIG. 2 illustrates a manual mode selection screen of a user according to an embodiment of the disclosure.
Figure 3:
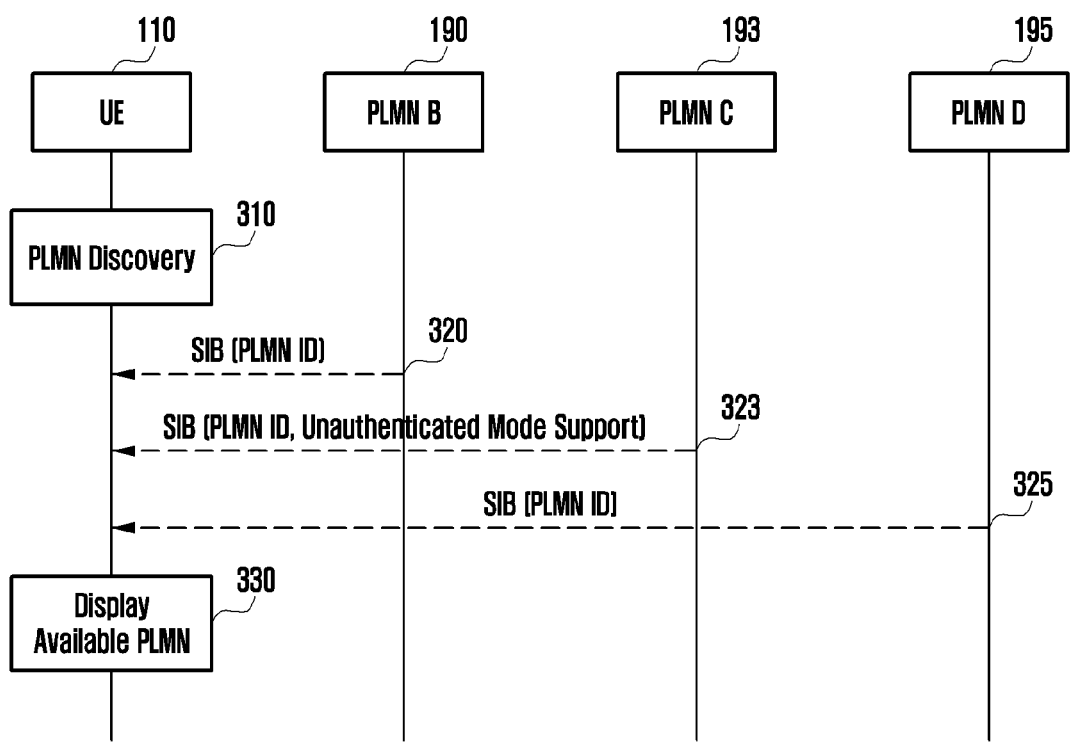
FIG. 3 illustrates a PLMN discovery procedure of a terminal according to an embodiment of the disclosure.

FIG. 2 illustrates a manual mode selection screen of a user according to an embodiment of the disclosure, and FIG. 3 illustrates a PLMN discovery procedure of a terminal according to an embodiment of the disclosure.

The disclosure provides a manual mode selection function of a user. If the user arrives at a personal or business travel destination and switches a selection mode of a mobile communication service provider into a manual selection mode, the UE 110 performs a mobile communication service provider discovery procedure. The UE 110 displays, on a user screen, whether the discovered service provider is a roaming partner of a home service provider or supports an unauthenticated mode, together with a list of available service providers (see the manual mode selection screen of FIG. 2). In the case where a PLMN discovery is performed (operation 310), the UE 110 determines whether the corresponding service provider supports an unauthenticated mode through system information broadcast (SIB) information broadcasted by a service provider (operations 320, 323, and 325). The UE 110 receives, through SIB information broadcasted by each service provider, the service provider's PLMN ID and information on whether the service provider supports the unauthenticated mode. This is illustrated in the PLMN discovery procedure of FIG. 3. In the example of FIG. 3, a PLMN B service provider 190 is a roaming partner service provider of the UE 110. A PLMN C service provider 193 is not a roaming partner service provider of the UE 110 but a service provider that supports the unauthenticated mode. A PLMN D service provider 195 is neither a roaming partner service provider of the UE 110 nor supports the unauthenticated mode.

The UE 110 displays information on each service provider on the user screen, on the basis whether the service provider is a roaming service provider registered in the USIM and information on whether the service provider supports the unauthenticated mode extracted from broadcast information (operation 330).

Second Embodiment

Figure 4A:
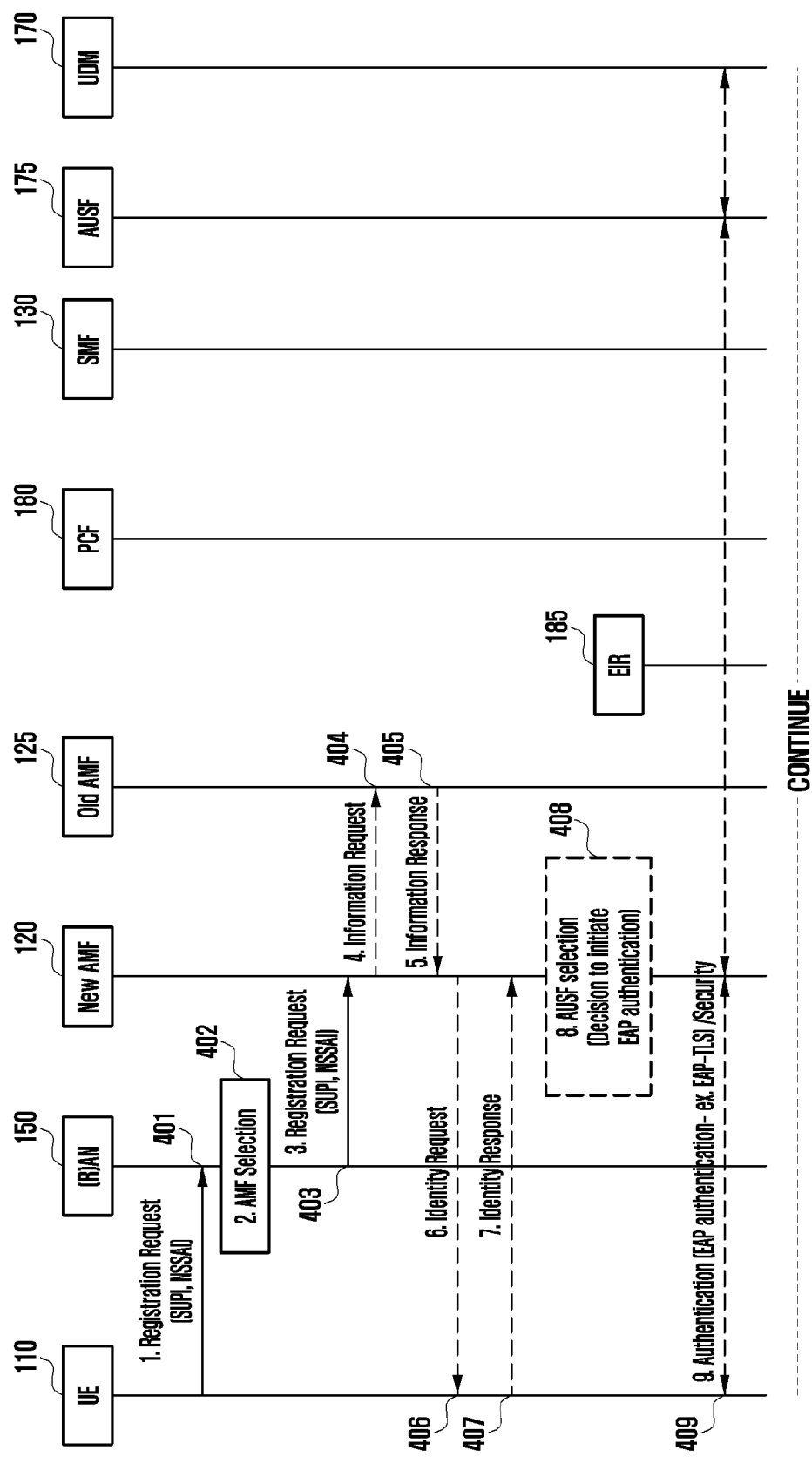
FIG. 4A and FIG. 4B illustrate an available DNN and a service discovery procedure for each service provider according to an embodiment of the disclosure.
Figure 4B:
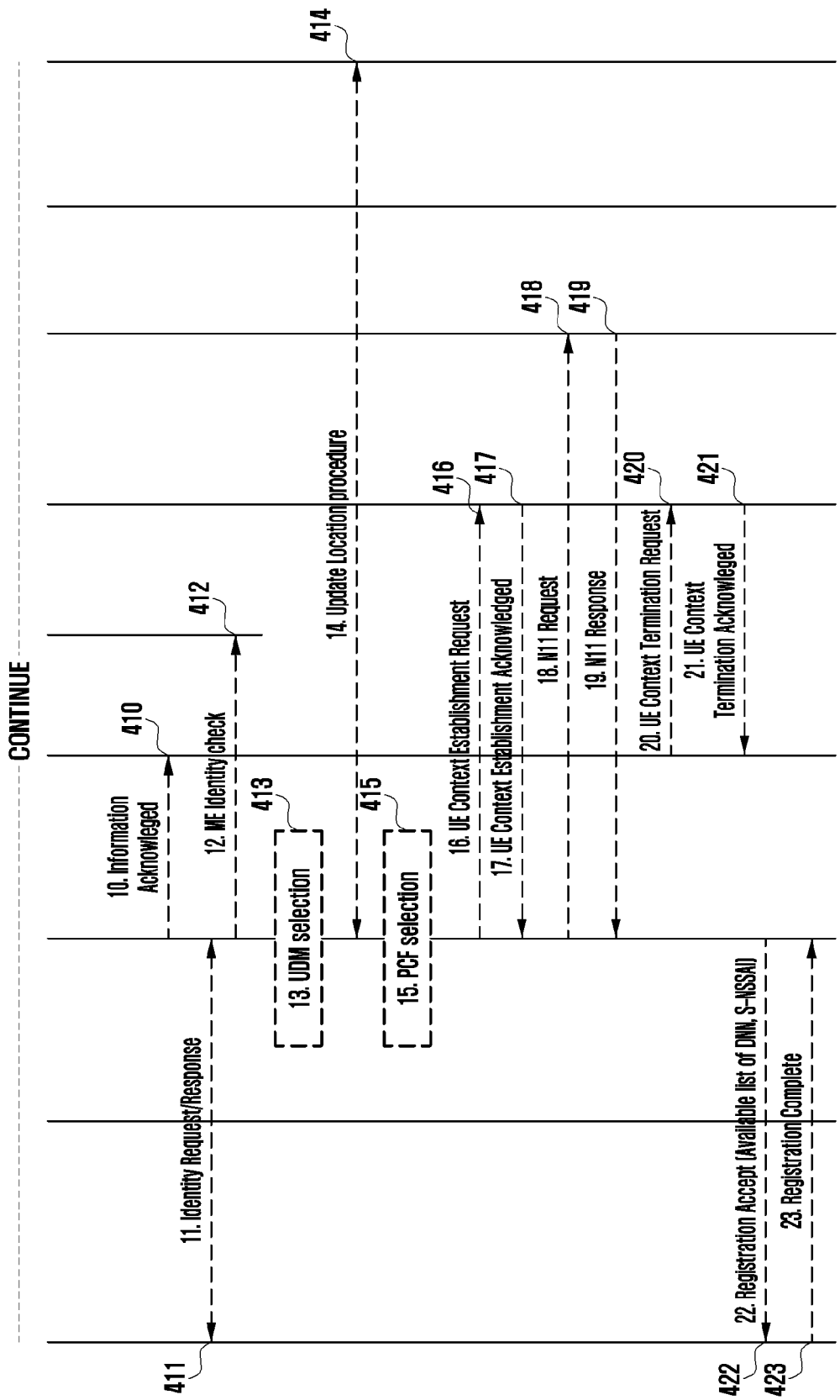

FIG. 4A and FIG. 4B illustrate an available DNN and a service discovery procedure for each service provider according to an embodiment of the disclosure.

The second embodiment is a procedure for discovering an available data network name (DNN) for each service provider of the UE 110. The UE 110 performs a registration procedure for the PLMN for supporting the unauthenticated mode. In a case where the registration procedure is performed, it is checked whether there is a DNN available as a data voucher of the UE 110.

The UE 110 transmits a registration request including an indicator for indicating that access is performed in an unauthenticated mode. The information of the UE 110 may include an international mobile subscriber identity (IMSI), an international mobile equipment identity (IMEI), a terminal manufacturing number, a terminal manufacturer number, and whether to include or not a certificate. In the case where the UE 110 performs registration in order to access a DN allowed for the data voucher, the UE 110 transmits a message including ID information existing in the data voucher.

If the network (AMF) 120 supports the unauthenticated mode, the network (AMF) 120 interprets the IMSI information of the UE 110 and the ID information transmitted by the UE 110, and identifies whether to allow the same through the subscriber information. The network 120 allows access of the UE 110 and transmits, to the UE 110, information on a data network allowing access of the UE 110.

If the UE 110 attempts to access a network in the unauthenticated mode, the UE 110 notifies the network of the unauthenticated mode or a device authentication access mode. The network is notified of a subscription permanent identifier (SUPI) included in the registration message of the UE 110 by using a network access identifier (NAI)-based SUPI, or the network is notified of an access mode through a separate indicator. The network may request device authentication from the UE 110, and the UE 110 performs device authentication in the network requiring device authentication. The above process may operate as illustrated in FIGS. 4A and 4B.

In operations 401 and 402 of illustrated FIGS. 4A and 4B, the UE 110 notifies the network 120 of a device authentication access mode through the SUPI. The network (AMF) 120 determines whether to provide device authentication (operations 403 to 407), and initiates a device authentication (e.g., extensible authentication protocol-transport layer security (EAP-TLS)) procedure (operation 408). In this case, the AMF 120 selects an authentication server function (AUSF) 175 capable of performing device authentication of the UE 110. The UE 110, the AMF 120, and the AUSF 175 perform a device authentication procedure (e.g., EAP-TLS) (operation 409). If the device authentication procedure is successfully performed, the ANF 120 transmits to the UE 110 a list of DNNs and S-NSSAIs usable by the UE 110 (operations 410 to 422).

Third Embodiment

Figure 5:
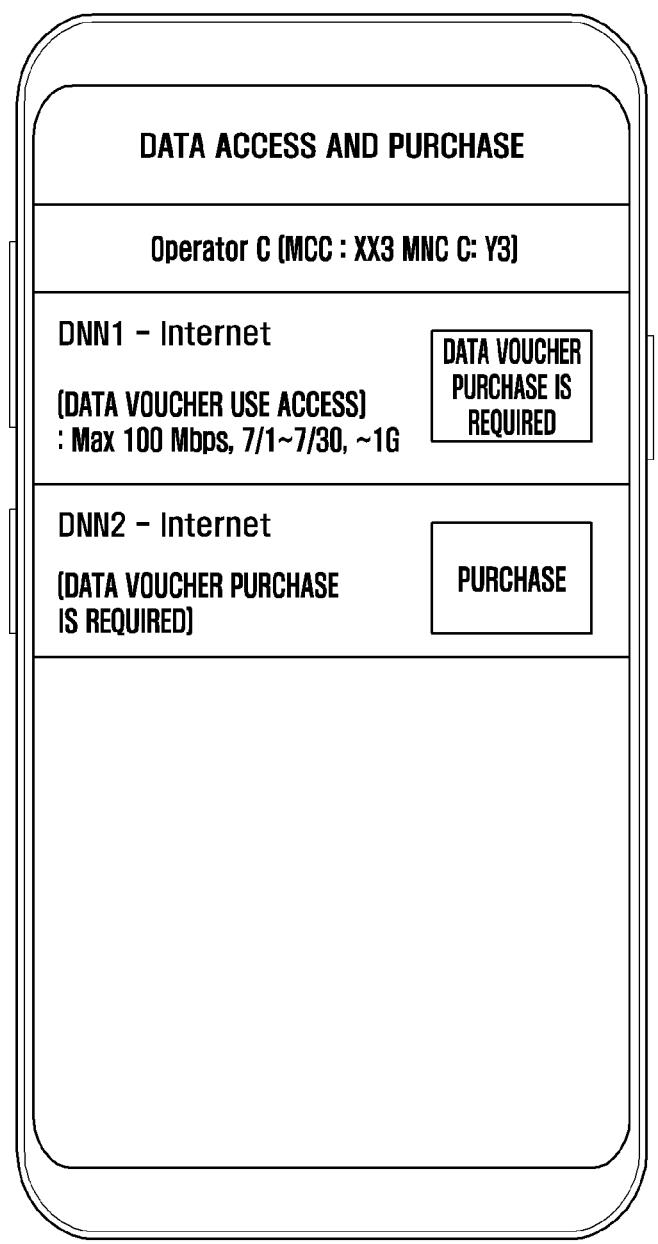
FIG. 5 illustrates a DN information display screen allowing access of a specific service provider according to an embodiment of the disclosure.

FIG. 5 illustrates a DN information display screen allowing access of a specific service provider according to an embodiment of the disclosure.

According to a third embodiment of the disclosure, information of DNs for which access is allowed in the PLMN is displayed on the screen of the UE 110. As illustrated in FIG. 5, in the process of performing a registration procedure, available DN information collected for each PLMN is displayed on the UE 110. The UE 110 that is in a service provider manual selection mode displays DN information or service information on the screen so as to allow a user to select a DN to be accessed.

If the user UE 110 has a data voucher, a data use access button is displayed. If the user presses the data access button, a session generation procedure is performed. The UE 110 performs a secondary authentication process by using authentication information (credential, that is, an ID and a password or a certificate) included in the data voucher. The UE 110 may display DN information for accessing a portal server operated by a data shop registered in a local mobile communication service provider. If the user presses a purchase button, the UE 110 generates a data session for portal access.

Fourth Embodiment

Figure 6B:
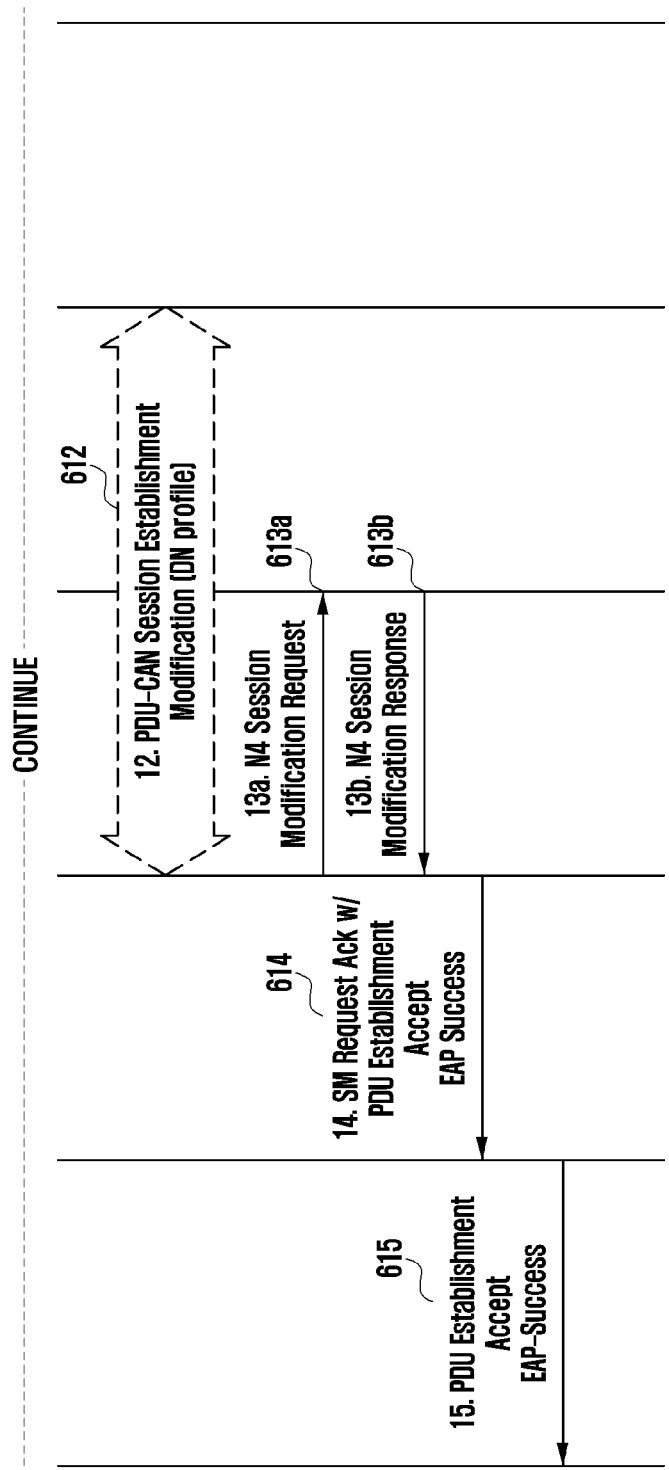

FIG. 6A and FIG. 6B illustrate a session access authentication procedure and a DN profile reception and setting procedure according to an embodiment of the disclosure.

In a fourth embodiment, details related to a session access and authentication procedure will be described.

The UE 110 performs EAP authentication through authentication information in the data voucher. After successful authentication, the authentication server (DN AAA) 140 transfers to the SMF 130 a DN service profile allowed for the data voucher. This process is performed in the same procedure as that illustrated in the session access and authentication procedure of FIGS. 6A and 6B.

In operations 601 and 602 of FIGS. 6A and 6B, during generation of a protocol data unit (PDU) session, the UE 110 may transmit a message including an indicator requiring external DN authentication to the AMF 120 and the SMF 130. In operations 604 to 606, the UE 110 transmits ID information included in the data voucher to the SMF 130. In operations 607 and 608, the SMF 130 discovers the DN-AAA 140 on the basis of the information included in the ID. In operation 609, an EAP authentication procedure is performed between the UE 110, the SMF 130, and the authentication server 140. In operation 610, the authentication server (DN-AAA) 140 transmits a DN profile corresponding to the data voucher to the SMF 130. The DN profile includes a profile index agreed between an operator of the DN-AAA 140 and a user, or usage information provided to the user. The DN profile information includes QoS information provided to the user.

The DN profile information may include an IP filter allowed by a third party service provider, or URL information.

If necessary, the SMF 130 requests the DN profile from a policy control function (PCF) 180 so as to receive a QoS profile, and enforces a QoS and a billing policy corresponding thereto (operation 612). In operations 613a to 615, the AMF 120 notifies the UE 110 that DN access is successful.

Fifth Embodiment

Figure 7:
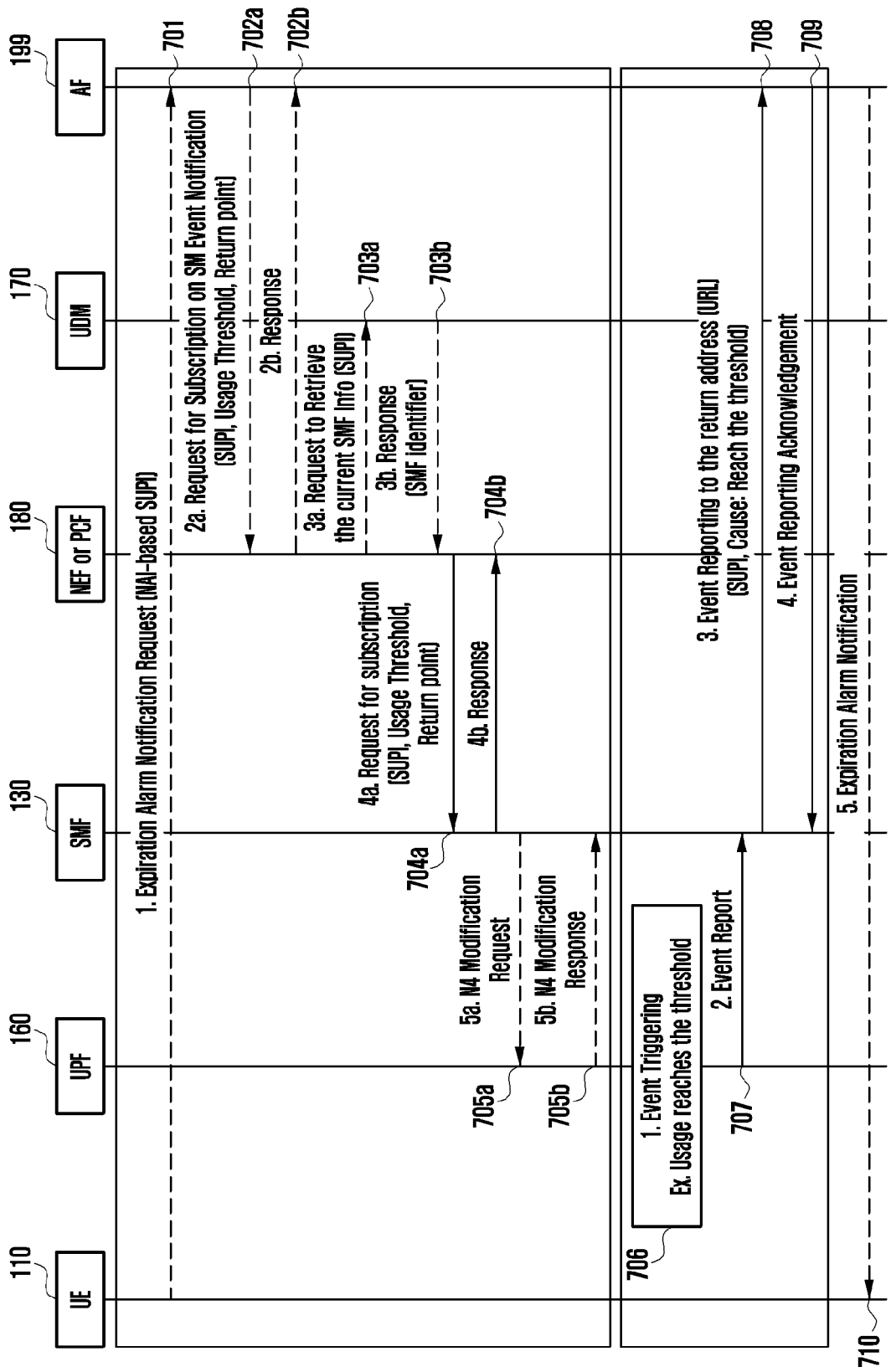
FIG. 7 illustrates a method for configuration and notification of usage exhaustion (AF triggered) according to an embodiment of the disclosure.
Figure 8:
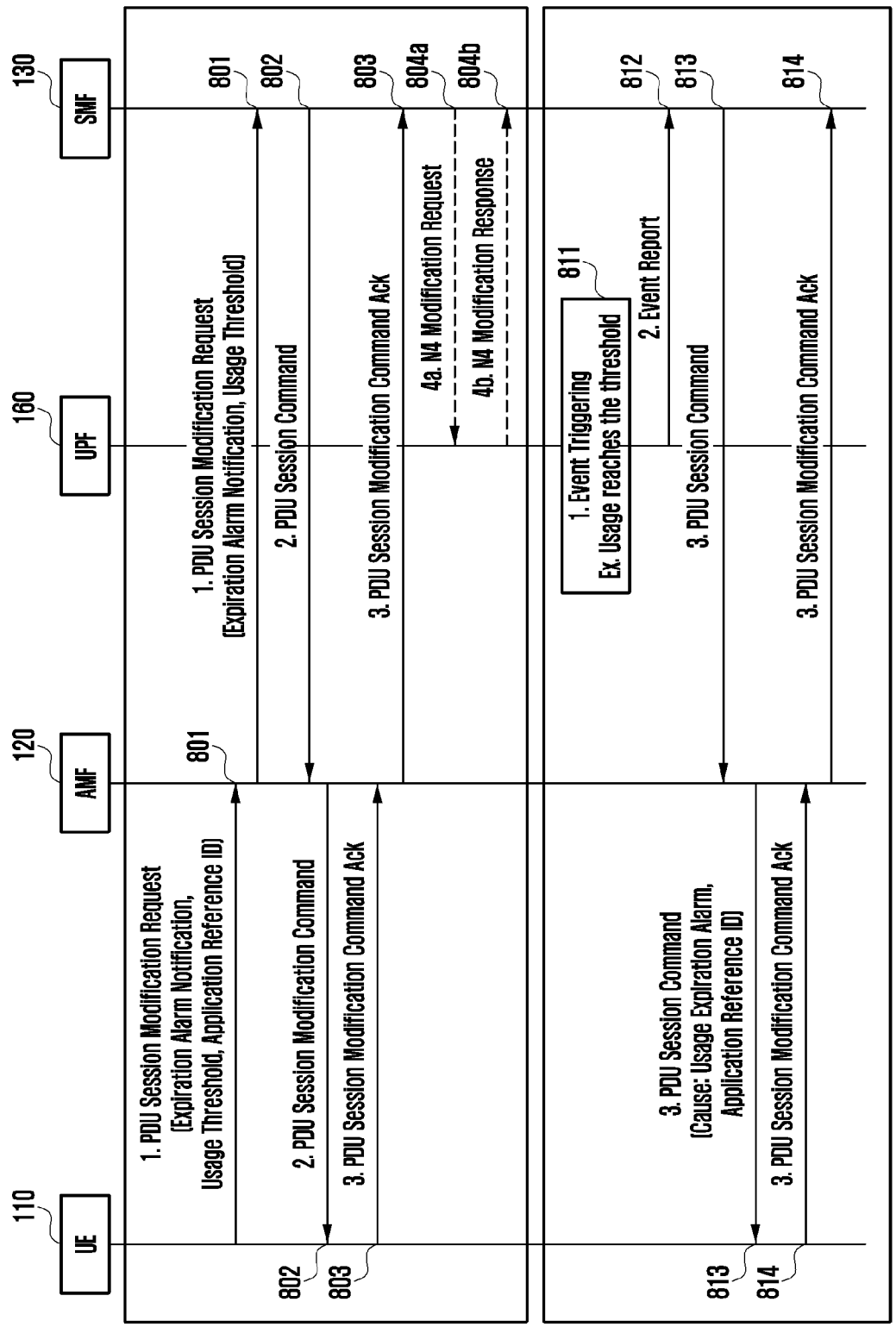
FIG. 8 illustrates a method for configuration and notification of usage exhaustion (UE subscription using NAS SM) according to an embodiment of the disclosure.
Figure 9:
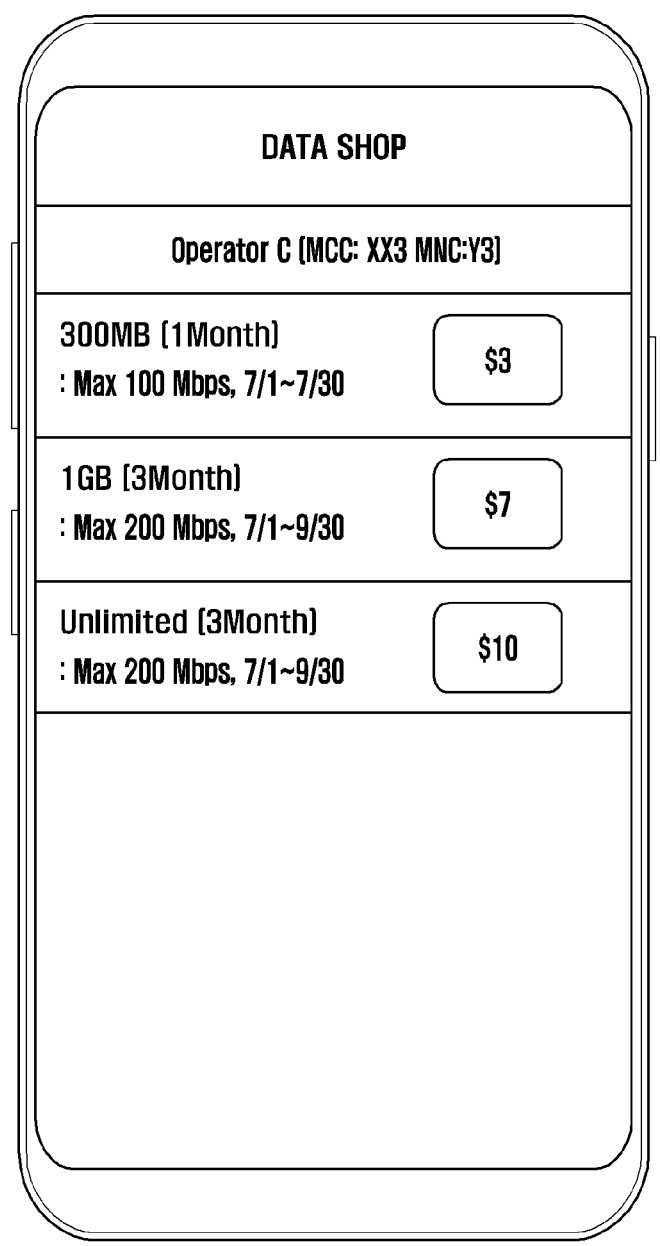
FIG. 9 illustrates a data voucher and period notification configuration screen according to an embodiment of the disclosure.

FIG. 7 illustrates a method for configuration and notification of usage exhaustion (AF triggered) according to an embodiment of the disclosure, FIG. 8 illustrates a method for configuration and notification of usage exhaustion (UE subscription using NAS SM) according to an embodiment of the disclosure, and FIG. 9 illustrates a data voucher and period notification configuration screen according to an embodiment of the disclosure.

The fifth embodiment relates to a service for expiration notification of a data voucher. As illustrated in FIG. 9, a user configures a usage exhaustion notification according to a data voucher. A method for configuration and notification of a threshold for usage for each session may include a method for configuration and notification of usage exhaustion through an application layer and a method for configuration and notification of usage exhaustion through an NAS layer on the basis of PDU session generation and modification procedure thereof.

In the method for configuration and notification of usage exhaustion through the application layer, the UE 110 registers usage exhaustion notification information in an operating system of the UE 110, or an app and a portable server (application server: AF) 199 installed in the UE 110 (operation 701). The data shop portal server (data shop) requests expiration notification configuration from the NEF/PCF 180 of a service provider (operations 702a and 702b). The usage exhaustion notification configuration and notification of expected usage exhaustion through the application layer are illustrated in FIG. 7. In operations 703a and 703b, the NEF/PCF 180 requests information of the serving SMF 130 from the UDM and receives the information. In operations 704a to 705b, the NEF/PCF 180 requests the SMF 130 to configure an event triggering condition in the UPF 160, and the SMF 130 may configure the event triggering condition in the UPF 160. In operation 706, the UPF 160 triggers an event, for example, if the usage reaches a threshold, and reports the event to the SMF 130 in operation 707. In operations 708 and 709, the SMF 130 may notify the AF 199 of a return address (URL), and in operation 710, the AF 199 may notify the UE 110 of the usage exhaustion notification.

In the method of configuration and notification of the expiration notification by utilizing an NAS layer, the user (UE 110) transmits a threshold for the expiration notification at the time of generation of the corresponding session, thereby requesting the expiration notification from the SMF 130 (operation 801), and the SMF 130 notifies of the UE 110 through a session modification in the case where expiration occurs (operation 813). An example of the method for configuration of usage exhaustion and notification of expected usage exhaustion through the NAS layer is illustrated in FIG. 8. In operation 801 to operation 803, the UE may configure the expiration notification to the SMF 130, through the AFM 120, by using a PDU session modification request including a threshold and a reference ID. In operations 804a to 804b, the SMF 130 may configure an event triggering condition in the UPF 160. In operation 811, the UPF 160 triggers an event, for example, if the usage reaches a threshold, and reports the event to the SMF 130 in operation 812. In operations 813 to 814, the SMF 130 may notify the UE 110 of the usage exhaustion including the reference ID.

Sixth Embodiment

The sixth embodiment relates to a method for notification of expected usage exhaustion.

The UE 110 counts the amount of transmission/reception of data after session generation. If the UE 110 detects session expiration, the UE 110 notifies the user of expected usage exhaustion, and guides portal server access.

The UE 110 calculates a data transmission/reception amount, and if the amount reaches a threshold, the UE 110 notifies the user of exhaustion. A method of counting data transmission/reception by the UE 110 and notifying of session expiration includes a method of counting usage in the UE 110, and a method of counting usage in a network and notifying the UE 110 of the same.

In the case of using the method of counting the usage in the UE 110, if the maximum usage of the UE 110 is indicated as Quota, the UE 110 counts the amount of data transmitted/received to/from each session. If the counted data amount is set by default or reaches a threshold configured by the user, an operating system of the UE 110 is notified of the same, and the operating system of the UE 110 notifies the user of the same. If the user is using data and the screen is turned on, the UE 110 displays on a screen in a pop-up or overlay manner. Otherwise, the UE 110 performs notification to the user through an internal notification message of the operating system without displaying on the screen.

In the case of using the method of counting a usage in a network, the network (SMF) 130 configures a DN profile corresponding to a data voucher, and then the UPF 160 calculates the usage. If the calculated usage reaches a threshold, the UPF 160 notifies the SMF 130 that the usage has reached the threshold, and the SMF 130 transfers the notification to the UE 110 through the SM-NAS. Data reporting between SMF-UPFs for online accounting may be performed using one of two methods. First, the SMF 130 configures reporting of data counting in the UPF 160. In configuring the reporting, a configuration value for a unit data report amount is configured. Further, if there has been transmission or reception of as many packets as the unit data report amount for each PDU session of the UE 110, the UPF 160 reports the same to the SMF 130. The SMF 130 identifies a threshold. In the second method, the SMF 130 configures the UPF 160 to report if the data amount reaches the threshold, and the UPF 160 counts the amount of transmitted or received data and reports the same to the SMF 130 if the data amount reaches the threshold.

Seventh Embodiment

According to a seventh embodiment, if the usage period expires and the usage is exhausted, a network stops a service for a session. Stopping of the session service may include a method for terminating the session, blocking Internet access to the session, and enabling only a specific service such as a portal server. First, in a method for terminating a session, if the usage period expires or the usage is exhausted, the SMF 130 performs a PDU session release procedure. The UE 110 detects session expiration, notifies the user of the reason for the session expiration, that is, the period expiration or the usage exhaustion and also transmits data shop information to the UE 110, and the UE 110 displays the data shop information. If the UE 110 attempts to access the data shop, the UE 110 generates a session for accessing the data shop.

Second, there is a method for changing session information. That is, if the usage period has expired or the usage is exhausted, the SMF 130 changes attributes for the session as follows. The SMF 130 changes a traffic filter rule to block Internet access traffic and allows only packets destined to the data shop. Alternatively, the SMF 130 detects HTTP traffic and redirects an HTTP request to the data shop. In the method for changing the session information, the network performs a session modification procedure in the UE 110, and in this process, the UE 110 detects session expiration and notifies the user of the reason for the session expiration (period expiration or usage exhaustion), and also displays data shop information. If the UE 110 attempts to access the data shop, the UE 110 uses the same session for accessing the data shop.

Eighth Embodiment

In an eighth embodiment, a data shop access screen and a purchase operation will be described. As illustrated in FIG. 9, a user may purchase a data voucher through a data shop and configure a usage exhaustion notification according to the data voucher.

The data shop server installs the voucher purchased by a user in the UE 110 through a browser or an application program (APP) of the UE 110. If the user wants to access a network by using the data voucher, the network may release the current PDU session or cancel registration of the currently accessed mobile communication network and perform re-access. In the case where the UE 110 re-accesses the network, the UE 110 may use information included in the data voucher in order to re-access the network or may use the information as authentication information in generation of a PDU session.

Ninth Embodiment

According to a ninth embodiment, a detailed example of information of data voucher sold by the data shop is shown.

The data voucher may include information such as data usage, usage period, where to use (PLMN list), and a temporary subscriber number for each service provider. Detailed information that the data voucher may include is as follows.

Voucher identification number (Voucher Identifier)
Serial number
Data usage and usage period (QUOTA)
Quota Profile ID
Usage bytes, usage time (in hours), usage period (from when to when)
QoS: 5QI/QCI, MBR, GBR, PDB, PER
Temporary/group subscriber number for each service provider
NAI based SUPI for accessing 5GC: Identity to be used for authentication during registration
Pre-reserved IMSI for accessing EPC
S-NSSAI or SST or DDN/APN
List of where to use
PLMN List
Data shop & information for authentication
Portal server URL, APP installation URL
DN-AAA server domain name
Voucher validity period
Voucher issuer
Signature of issuer Tenth Embodiment The tenth embodiment is a detailed example of a scenario in which a local mobile communication service provider operates a data shop. The scenario is such that a user accesses a local service provider portal after configuration of manual roaming at a trip destination/business trip destination, and purchases a data voucher.

Network search and selection (a case of manual configuration)
Registration process (if a home service provider of UE 110 is not a roaming partner with a local service provider)
Unauthenticated access is performed in the case of using preserved SUPI (a specific SST can be used)
In the case where registration to preserved SUPI is performed, DNN and S-NSSAI for portal access are advertised and a registration validity timer is transferred to a UE.
Portal session generation and portal server access
UE which has received a DNN for accessing a portal transmits PDU session generation request to a DNN
The network identifies SUPI and DNN of the UE 110 and allows generation of a PDU session for the restricted portal service.
Through the PCF 180/UDM 170, the configured portal address and restricted service profile (QoS, IP filter rule) are downloaded and enforced.
If the PDU session generation is allowed, an address of the portal server (in the case of operating a local service provider) of the UE 110 is transmitted to the UE 110.
The browser or APP of the UE 110 transmits an HTTP request to the received portal server.
A user accesses a data shop (operated by a local service provider) and inputs payment information (Differences with other models: Signing up as a new user to a local service provider. Credential provisioning is required for authentication of a service provider at signing up).
Payment Information: Credit card information, Samsung Pay, etc.

If a user purchases a data voucher, the UE 110 downloads the data voucher from a portal server.

If the user clicks the data voucher, data voucher use access is displayed in a service provider list on a service provider manual mode configuration screen.

If the user clicks the data voucher use access, a re-registration process is performed.

Re-registration Process (AMF (120))

If registration to preserved SUPI is performed in unauthenticated mode, a de-registration procedure is performed.

Registration attempt to SUPI included in a data voucher.

AMF 120 determines EAP authentication by using SUPI and initiates EAP authentication by transmitting EAP-Request/Identity to the UE (perform authentication using credential having received through portal access).

If the UE 110 transmits an EAP-Response/Identity (NAI), the AMF 120 determines an EAP-server based on a domain name of the NAI and transmits an authentication request to the AAA 140.

The UE 110, the AMF 120, and the authentication server 140 perform EAP authentication.

Session generation process

The UE 110 requests the generation of a PDU session, together with DNN or S-NSSAI included in the data voucher.

SMF 130 initiates the EAP authentication procedure. If the UE 110 responds using a voucher ID included in the data voucher, the SMF 130 discovers the AAA 140. The EAP authentication procedure is performed.

If the EAP authentication is successful, the DN-AAA 140 transmits a DN Profile ID. The SMF 130 downloads an agreed profile corresponding to the DN profile ID onto the PCF 180.

Eleventh Embodiment

The eleventh embodiment relates to a scenario in which a terminal manufacturer operates a data shop. In the present scenario, a user purchases a global roaming data voucher at the time of purchasing a mobile phone or at an online shop of a mobile phone manufacturer. The execution procedure of the present scenario is as follows.

Network search and selection (on the manual configuration screen, a service provider who can use a data voucher is found, and a user selects a data voucher)

Registration process (if a home service provider of UE 110 is not a roaming partner with a local service provider)

Registration attempt to a manufacturer's NAI in SUPI, the AMF 120 identifies the SUPI and determines whether to perform registration in an unauthenticated mode or terminal device authentication.

If it is determined to perform registration in terminal device authentication, the AMF 120 transmits an EAP-identity/request to the UE 110.

If the UE 110 transmits an EAP-response/identity (NAI), the AMF 120 identifies a domain name of the NAI and accesses a device authentication manufacturer EAP-Server.

The UE 110, the AMF 120, and the authentication server perform EAP authentication.

If the authentication is successful, the list of available DNNs and S-NSSAIs agreed with the terminal manufacturer is downloaded onto the UE 110.

Session generation process

The UE 110 requests generation of a PDU session, together with a DNN or S-NSSAI included in the data voucher.

SMF 130 initiates the EAP authentication procedure. If the UE 110 responds using a voucher ID included in the data voucher, the SMF 130 discovers the AAA 140. The EAP authentication procedure is performed.

If the EAP authentication is successful, the DN-AAA 140 transmits a DN Profile ID. The SMF 130 downloads the agreed profile corresponding to the DN Profile ID onto the PCF 180.

Portal session generation and portal server access (if device authentication is successful, but a data voucher has not purchased in advance)

The UE 110 which has received a DNN for accessing the portal server transmits a PDU session generation request to the DNN.

The network identifies SUPI and DNN of the UE 110 and allows generation of a PDU session for a restricted portal service (to Galaxy shop or local service provider shop).

Through the PCF 180/UDM 170, the configured portal address and restricted service profile (QoS, IP filter rule) are downloaded and enforced.

If the PDU session generation is allowed, an address of the portal server (in the case of operating a local service provider) is transmitted to the UE 110.

The browser or APP of the UE 110 transmits an HTTP request to the received portal server.

The user inputs payment information by accessing a data shop operated by the manufacturer. The present scenario is different from the eleventh embodiment in that the device certificate has been already provisioned in the UE 110.

If the user purchases a data voucher, the portal server downloads the data voucher onto the UE 110.

If the user clicks on the data voucher, the data voucher use access is displayed in a service provider list on a service provider manual mode configuration screen.

If the user clicks the data voucher use access, a re-registration process is performed.

Twelfth Embodiment

The twelfth embodiment relates to configuration of the condition of a usage monitoring report in the UPF 160 by the SMF 130. The SMF 130 configures, in the UPF 160, a reporting condition of the usage monitoring according to the data voucher use of the UE 110. The SMF 130 configures the usage status reporting condition according to the usage, in the UPF 160, through information received from the DN profile. Information configured in the UPF 160 by the SMF 130 includes the following details.

Maximum usage with respect to packet usage

Threshold for packet usage report

QoS Profile (5QI/QCI) value and usage for each QoS

Threshold for each QoS

The UPF 160 reports the following to the SMF 130 according to the usage monitoring report condition from the SMF 130. The condition of the report monitored by the SMF 130 of the UPF 160 is as follows.

If the packet usage for a session of the UE 110 has reached the maximum usage If the packet usage for the session of the UE 110 has reached a threshold If the packet usage for a QoS profile (5QI/QCI) of the session of the UE 110 has reached the maximum usage If the packet usage for the QoS profile (5QI/QCI) of the session of the UE 110 session has reached the threshold If the total usage time of the session of the UE 110 has reached the maximum usage time If the total usage time of the session of the UE 110 has reached the threshold In addition, the SMF 130 may configure, in the UPF 160, information relating to QoS that the UE 110 may use as an uplink, and if the UE 110 performs packet transmission by using a QoS corresponding to an uplink QoS that is not allowed, the UPF 160 may report that the packet corresponds to the same.

Figure 11:
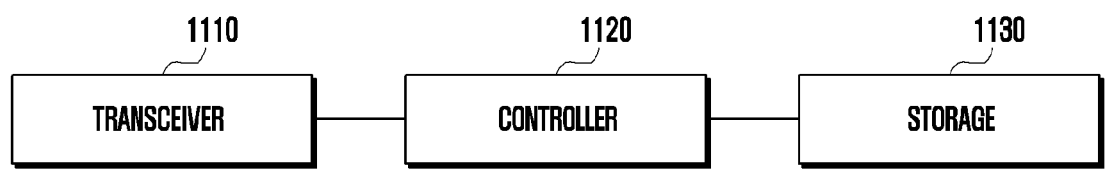
FIG. 11 illustrates a structure of a terminal according to an embodiment of the disclosure.

FIG. 11 illustrates a structure of a terminal according to an embodiment of the disclosure.

Referring to FIG. 11, the terminal may include a transceiver 1110, a controller 1120, and a storage 130. In the disclosure, the controller 1120 may be defined as a circuit, an application-specific integrated circuit, or at least one processor.

The transceiver 1110 may transmit or receive a signal to or from another network entity.

The controller 1120 may control the overall operation of the terminal according to embodiments proposed by the disclosure. For example, the controller 1120 may control a signal flow between blocks to perform an operation according to the flowchart described above. In detail, the controller 1120 may perform control to use a data service, an audio/video communication service, and an additional service of a local service provider by using a data voucher provided by a local service provider according to embodiments of the disclosure.

The storage 1130 may store at least one piece of information transmitted or received through the transceiver 1110 and information generated through the controller 1120.

Figure 12:
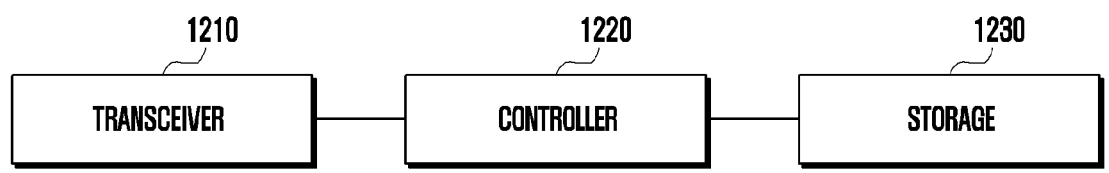
FIG. 12 illustrates a structure of a network entity according to an embodiment of the disclosure.

FIG. 12 illustrates a structure of a network entity according to an embodiment of the disclosure.

Referring to FIG. 12, the network entity may include a transceiver 1210, a controller 1220, and a storage 1230. In the disclosure, the controller 1220 may be defined as a circuit, an application-specific integrated circuit, or at least one processor.

The transceiver 1210 may transmit or receive a signal to or from a UE 110 or another network entity.

The controller 1220 may control the overall operation of the network entity according to embodiments proposed by the disclosure. For example, the controller 1220 may control a signal flow between blocks to perform an operation according to the flowchart described above. In detail, the controller 1220 may perform control to use a data service, an audio/video communication service, and an additional service of a local service provider by using a data voucher provided by a local service provider according to embodiments of the disclosure.

The storage 1230 may store at least one piece of information transmitted or received through the transceiver 1210 and information generated through the controller 1220.

The invention claimed is:

1. A method performed by a session management function (SMF) in a communication system, the method comprising:

transmitting, to a data network authentication authorization accounting (DN-AAA) server, a first message for authenticating a protocol data unit (PDU) session associated with a terminal;

receiving, from the DN-AAA server, a second message as a response to the first message, the second message including a data network (DN) profile index;

transmitting, to a policy control function (PCF), the DN profile index; and receiving, from the PCF, a quality of service (QoS) profile associated with the DN profile index.

2. The method of claim 1, wherein the QoS profile includes at least one of a 5G QoS identifier (5QI) or a QoS class identifier (QCI).

3. The method of claim 1, wherein the DN profile index is for retrieving the QoS profile configured in the PCF.

4. The method of claim 1, further comprising:

receiving, from the terminal, an establishment request message for the PDU session.

5. The method of claim 4, wherein the establishment request message for the PDU session is for attaching a network of a public land mobile network (PLMN) supporting a restricted service.

6. A method performed by a data network authentication authorization accounting (DN-AAA) server in a communication system, the method comprising:

receiving, from a session management function (SMF), a first message for authenticating a protocol data unit (PDU) session associated with a terminal; and in case that the authenticating of the PDU session is confirmed, transmitting, to the SMF, a second message as a response to the first message, the second message including a data network (DN) profile index, the DN profile index instructs the SMF to transmit, to a policy control function (PCF), the DN profile index and to receive, from the PCF, a quality of service (QoS) profile associated with the DN profile index.

7. The method of claim 6, wherein the QoS profile includes at least one of a 5G QoS identifier (5QI) or a QoS class identifier (QCI).

8. The method of claim 6, wherein the DN profile index is for retrieving the QoS profile in the PCF.

9. A session management function (SMF) in a communication system, the SMF comprising:

a transceiver; and a controller configured to:

transmit, to a data network authentication authorization accounting (DN-AAA) server via the transceiver, a first message for authenticating a protocol data unit (PDU) session associated with a terminal, receive, from the DN-AAA server via the transceiver, a second message as a response to the first message, the second message including a data network (DN) profile index, transmit, to a policy control function (PCF) via the transceiver, the DN profile index, and receive, from the PCF via the transceiver, a quality of service (QoS) profile associated with the DN profile index.

10. The SMF of claim 9, wherein the QoS profile includes at least one of a 5G QoS identifier (5QI) or a QoS class identifier (QCI).

11. The SMF of claim 9, wherein the DN profile index is for retrieving the QoS profile in the PCF.

12. The SMF of claim 9, wherein the controller is further configured to:

receive, from the terminal via the transceiver, an establishment request message for the PDU session.

13. The SMF of claim 12, wherein the establishment request message for the PDU session is for attaching a network of a public land mobile network (PLMN) supporting a restricted service.

14. A data network authentication authorization accounting (DN-AAA) server in a communication system, the DN AAA server comprising:
  a transceiver; and
  a controller configured to:
    receive, from a session management function (SMF) via the transceiver, a first message for authenticating a protocol data unit (PDU) session associated with a terminal, and
    in case that the authenticating of the PDU session is confirmed, transmit, to the SMF via the transceiver, a second message as a response to the first message, the second message including a data network (DN) profile index, wherein the DN profile index instructs the SMF to transmit, to a policy control function (PCF), the DN profile index and to receive, from the PCF, a quality of service (QoS) profile associated with the DN profile index.

15. The DN-AAA server of claim 14, wherein the QoS profile includes at least one of a 5G QoS identifier (5QI) or a QoS class identifier (QCI).

16. The DN-AAA server of claim 14, wherein the DN profile index is for retrieving the QoS profile in the PCF.

* * * * *